United States Patent [19]

Nishimura et al.

[11] Patent Number: 4,714,955
[45] Date of Patent: Dec. 22, 1987

[54] SOLID-STATE COLOR IMAGE PICKUP APPARATUS

[75] Inventors: Ryuji Nishimura; Minoru Kato, both of Yokohama; Masaru Noda, Kanagawa; Takuya Imaide, Yokohama, all of Japan

[73] Assignee: Hitachi, Ltd., Tokyo, Japan

[21] Appl. No.: 927,140

[22] Filed: Nov. 5, 1986

[30] Foreign Application Priority Data

Nov. 6, 1985 [JP] Japan ................................ 60-247052
Jan. 20, 1986 [JP] Japan .................................. 61-7914

[51] Int. Cl.$^4$ ........................ H04N 9/07; H04N 9/077
[52] U.S. Cl. ........................................ 358/48; 358/44; 358/43
[58] Field of Search ........................ 358/48, 43, 44, 41, 358/29 C

[56] References Cited

U.S. PATENT DOCUMENTS

| | | | |
|---|---|---|---|
| 4,329,709 | 5/1982 | Masuda et al. | 358/44 |
| 4,415,923 | 11/1983 | Noda | 358/41 |
| 4,460,919 | 7/1984 | Takemura | 358/44 |
| 4,467,347 | 8/1984 | Ozawa et al. | 358/48 X |
| 4,516,154 | 5/1985 | Nishizawa et al. | 358/48 X |
| 4,570,178 | 2/1986 | Morimura et al. | 358/44 |
| 4,591,900 | 5/1986 | Heeh et al. | 358/44 |
| 4,626,897 | 12/1986 | Sato et al. | 358/44 |
| 4,638,352 | 1/1987 | Noda et al. | 358/43 X |

FOREIGN PATENT DOCUMENTS

| | | | |
|---|---|---|---|
| 0171791 | 2/1986 | European Pat. Off. | 358/44 |
| 58-050881 | 3/1983 | Japan | 358/48 |
| 58-198978 | 11/1983 | Japan . | |
| 59-062285 | 4/1984 | Japan | 358/44 |
| 59-154891 | 9/1984 | Japan | 358/48 |
| 59-171382 | 9/1984 | Japan | 358/48 |

OTHER PUBLICATIONS

Imaide, "Single-Chip Color Cameras with Reduced Aliasing", Oct. 1985, pp. 43-48.

Primary Examiner—James J. Groody
Assistant Examiner—E. Anne Faris
Attorney, Agent, or Firm—Antonelli, Terry & Wands

[57] ABSTRACT

A color video camera using a solid-state image pickup device having filters of the complementary color system consisting of a filter to transmit the light of all colors, a filter to transmit the yellow light, a filter to transmit the cyan light, and a filter to transmit the green light can obtain color signals having no color aliasing by selecting the conditions of the arithmetic operating processes of the signals corresponding to the respective filters. In these conditions, assuming that the signals corresponding to the four kinds of filters are represented by W, Ye, Cy and G in correspondence to the colors of the respective filters, a red signal and a blue signal are produced by the arithmetic operations represented by the following expressions:

$$R = \alpha W - \beta Cy + \gamma Ye - \delta G$$

$$B = \alpha' W + \beta' Cy - \gamma' Ye - \delta' G$$

wherein the respective arithmetic operational ratios $\alpha$, $\beta$, $\gamma$, $\delta$, $\alpha'$, $\beta'$, $\gamma'$, and $\delta'$ are set so as to satisfy the condition of the following expression:

$$\alpha W + \beta Cy = \gamma Ye + \delta G \text{ or } \alpha' W + \gamma' Ye = \beta' Cy + \delta' G.$$

This setting is realized by setting the amplification factors of the amplifiers to amplify the respective signals which are output in correspondence to the respective filters so as to meet this condition and by adding and subtracting those outputs.

10 Claims, 19 Drawing Figures

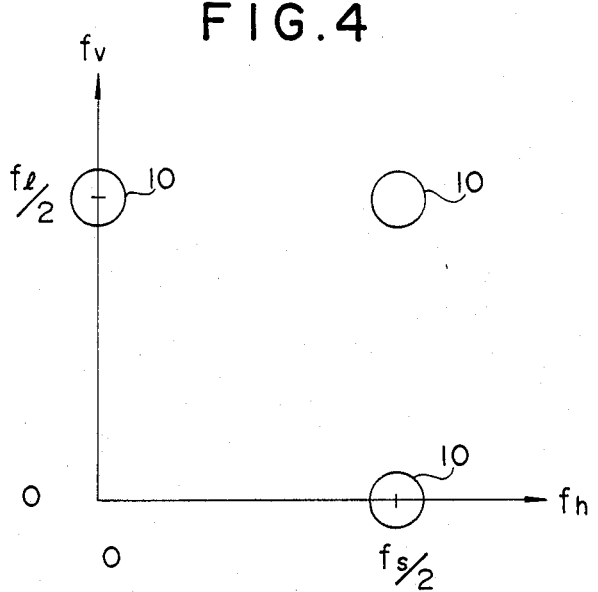

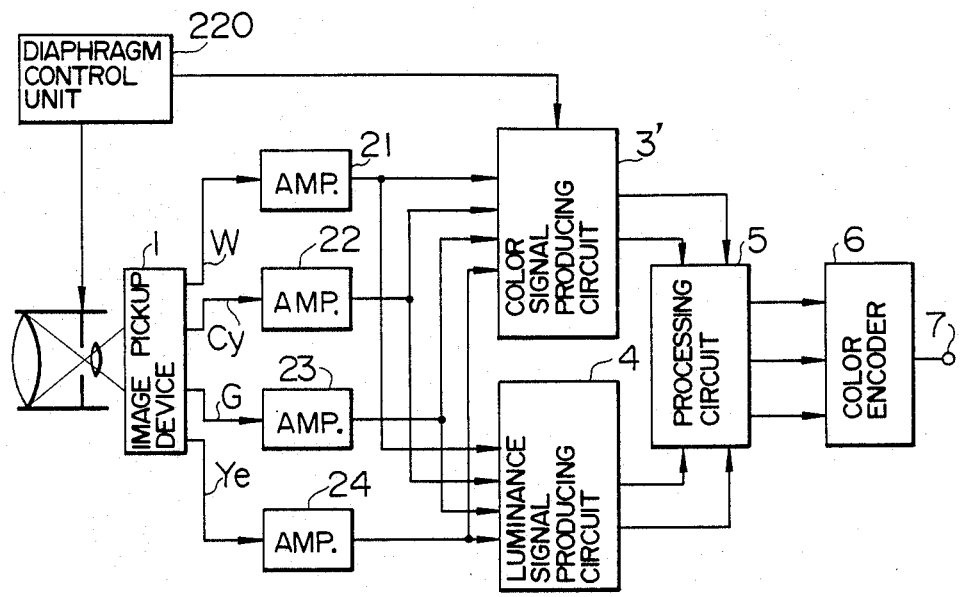

SOLID-STATE COLOR IMAGE PICKUP APPARATUS

BACKGROUND OF THE INVENTION

The present invention relates to a color video camera using a solid-state image pickup device and, more particularly, to a signal processing apparatus for arithmetically operating a plurality of signals which are output from an image pickup device having a number of small color separation optical filters, thereby producing color signals.

Recently, home-use VTRs have widely been used and in association of this widespread use, the need is more and more increasing for the color video camera which can be used together with the home-use VTR and for the integrated color video camera which is constructed integrally with the VTR. In such color video cameras, it is necessary not only to satisfy the fundamental performances such as high sensitivity and high picture quality but also to satisfy the requirements for small size and low price. For this purpose, the single tube type or single plate type color video camera in which only one image pickup tube or solid-state image pickup device is used in the image pickup section is the main current.

In such a single tube type or single plate type color video camera, small color separation optical filters which can transmit different color lights are regularly arranged on the photo sensing surface of the image pickup tube or solid-state image pickup device (hereinafter, generally referred to as the image pickup device), the respective signals corresponding to the color separation optical filters are arithmetically operated, and the luminance signal and chrominance signal in accordance with the television system are produced. In this case, as the color separation optical filter, the filters of what is called a complementary color system which can respectively transmit the yellow, cyan, and transparent lights whose light transmission amounts are large are more advantageous to realize high sensitivity rather than the filters of primary color lights (namely, red, green, and blue) whole light transmission amounts are small.

However, in the color video camera having the image pickup device provided with such color separation optical filters (hereinafter, referred to as color filters), when an image of an object of a fine picture pattern is picked up, a pseudo signal called an aliasing is produced, causing the picture quality to remarkably deteriorate. The aliasing is the beat interference which is caused by the sampling of the video signal due to the picture elements array corresponding to the respective color filters.

As the technique to suppress such an aliasing there is proposed a method disclosed in, for example, "SINGLE-CHIP COLOR CAMERAS WITH REDUCED ALIASING", International Electronic Imaging Exposition & Conference, the advance printing of paper summaries, pages 43-48, Oct. 7-10, 1985, Electronic Imaging '85. According to this method, the aliasing which is caused in the luminance signal (this aliasing is called the luminance aliasing) is suppressed by use of a luminance matrix. On the other hand, the aliasing (called the color aliasing) is also similarly generated in the color signal at the spatial frequency of the picture pattern which corresponds to ½ of the sampling frequency according to the arrangement of color filters. To reduce this color aliasing, for example, a method as disclosed in Japanese Patent Laid-Open No. 198978/83 (corresponding U.S. application Ser. No. 494,449) is proposed. According to this method, the optical low pass filter consisting of two birefringence plates such as crystal plates and the ¼ wavelength plate and the like are combined, thereby reducing the response of the spatial frequency band of the incident light in which the aliasing will be generated.

Although the luminance aliasing can be suppressed by the aliasing suppressing means using the luminance matrix mentioned above, the color aliasing cannot be reduced. The color aliasing becomes, in particular, a large obstacle in the case of the system using the color filters of the complementary color system which are used to improve the sensitivity. If two crystal filters mentioned above are used to reduce the color aliasing the response to the necessary signal will be also simultaneously reduced. Thus, the resolution deteriorates and it is difficult to obtain a high picture quality as the fundamental performance. In addition, since the crystal filter is expensive, there is the problem such that it doesn't meet the object to provide a cheap homeuse camera.

SUMMARY OF THE INVENTION

It is an object of the present invention to provide a solid-state color image pickup apparatus which can suppress the occurrence of the color aliasing and can obtain the color video signal of a good picture quality.

To accomplish this object, the present invention has an image pickup section equipped with four kinds of color separation optical filters (color filters) of different spectral sensitivities and when a plurality of color signals are produced by arithmetically operating four signals corresponding to the respective color filters, the arithmetic operational ratios are independently set for the respective color signals. These arithmetic operational ratios are set so as to correct the sensitivity differences among the respective color filters when the color signals are produced, thereby reducing the color aliasing. For example, assuming that the outputs from four kinds of color filters are $S_1$ to $S_4$ and two color signals such as red signal, blue signal, or the like are $C_1$ and $C_2$, the two color signals $C_1$ and $C_2$ are arithmetically operated from the outputs $S_1$ to $S_4$ so as to satisfy the following relations.

$$C_1 = \alpha S_1 - \beta S_2 + \gamma S_3 - \delta S_4$$

$$C_2 = \alpha' S_1 + \beta' S_2 - \gamma' S_3 - \delta' S_4$$

Also, the respective arithmetic operational ratios $\alpha$, $\alpha'$, $\beta$, $\beta'$, $\gamma$, $\gamma'$, $\delta$, and $\delta'$ are set so as to almost satisfy the following relation.

$$\alpha S_1 + \beta S_2 = \gamma S_3 + \delta S_4 \text{ or } \alpha' S_1 + \gamma' S_3 = \beta' S_2 + \delta' S_4$$

Further, the following features can be added to suppress the color aliasing of the green signal.

Four kinds of color filters are respectively constituted by a transparent (W) filter to transmit all of the color lights, a yellow (Ye) filter to transmit the yellow light, a cyan (Cy) filter to transmit the cyan light, and a green (G) filter to transmit the green light. Assuming that the signals which are derived by the lights transmitted through the respective color filters are represented by W, Ye, Cy, and G, respectively, the green (g) signal is calculated by the following arithmetic expression.

$$g = -W + Ye + Cy + 3G$$

According to the features of the present invention, in order to obtain one color signal, the outputs of a plurality of color filters are used and arithmetically operated, so that the aliasing components are eliminated and the color aliasing is reduced.

BRIEF DESCRIPTION OF THE DRAWINGS

FIG. 3 is a partial diagram showing an example of an arrangement of color separation optical filters arranged on the picture elements of an image pickup device;

FIGS. 4 and 5 are coordinates showing the positions on two-dimensional spatial frequencies at which the aliasings are generated;

FIG. 13 is a block diagram of a signal processing circuit of a video camera according to further another embodiment of the invention and shows an example in an arithmetic operational ratio is changed in dependence on a magnitude of a photo signal to be input to an image pickup device;

FIGS. 14A and 14B are arrangement diagrams showing other examples of color separation optical filters of the complementary color system;

DESCRIPTION OF THE PREFERRED EMBODIMENTS

Figure 1:
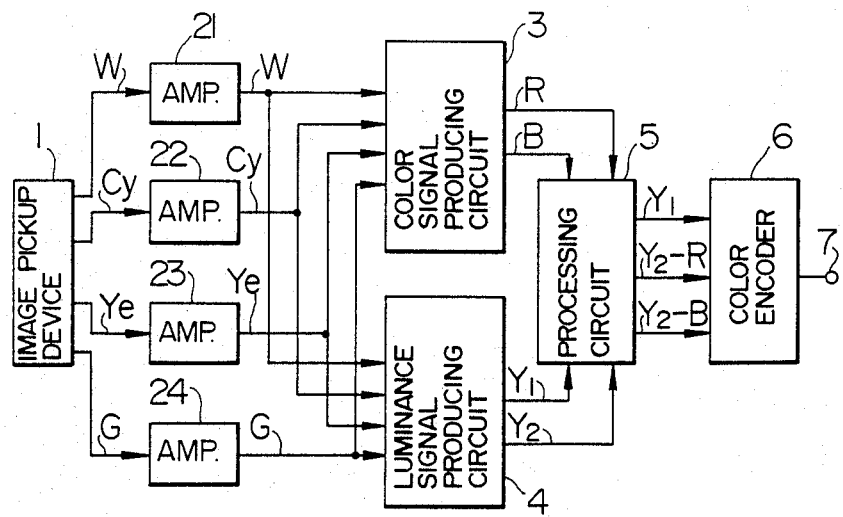
FIG. 1 shows an example of a signal processing circuit of a video camera according to one embodiment of the present invention.

FIG. 1 is a block diagram showing an embodiment of a solid-state color camera according to the present invention. An image pickup device 1 outputs signals according to amounts of light reception by matrix switches and the like (not shown) which are sequentially controlled by, for example, a horizontal scanning circuit and a vertical scanning circuit (both circuits are not shown). Amplifiers 21 to 24 respectively amplify four kinds of signals which are individually output from the image pickup device 1 in accordance with the respective color filters. A color signal producing circuit 3 produces color signals from the outputs of the image pickup device 1 by the arithmetic operation. A luminance signal producing circuit 4 similarly produces the luminance signals.

In the diagram, the image pickup device 1 has the color separation optical filters as previously mentioned and has the photo sensing surface in which respective photo sensing elements having color filters are arranged as shown in, e.g., FIG. 3. The W signal (achromatic), Cy signal (cyan), Ye signal (yellow), and G signal (green) are separated and output, respectively. These signals are amplified by the amplifiers 21 to 24 and supplied to the color signal producing circuit 3 and luminance signal producing circuit 4, respectively.

The color signal producing circuit 3 arithmetically operates the W, Cy, Ye, and G signals at arithmetic operational ratios, which will be explained hereinafter, and produces two color signals, namely, a red signal (hereinafter, referred to as an R signal) and a blue signal (hereinafter, referred to as a B signal).

On the other hand, the luminance signal producing circuit 4 sets the addition ratios of the W, Cy, Ye, and G signals so as to substantially equalize, for example, their signal amounts and produces a luminance signal $Y_1$ of a wide band (frequency component) in which the aliasing is small. In addition, the luminance signal producing circuit 4 adds the W, Cy, Ye, and G signals at addition ratios so as to obtain good color reproduction and produces a luminance signal $Y_2$ of a narrow band (frequency component) to produce color difference signal. The produced $Y_1$, $Y_2$, R, and B signals are subjected to well-known signal processes such as gamma correction, clamping process, white balance correction, and the like by a processing circuit 5, so that the processed $Y_1$ signal and two color difference signals of $(Y_2 - R)$ and $(Y_2 - B)$ are produced. These signals are supplied to a color encoder 6 and a color video signal of, e.g., the NTSC system is formed and this signal is supplied as a camera output signal to an output terminal 7.

Figure 2:
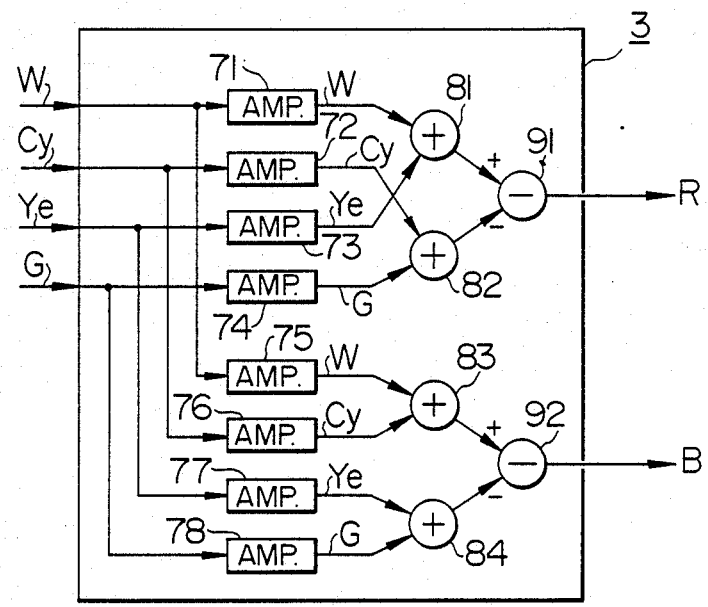
FIG. 2 is a circuit arrangement diagram showing a practical example of a color signal producing circuit in FIG. 1.

FIG. 2 is a block diagram showing an example of a practical constitution of the color signal producing circuit 3 in FIG. 1. Reference numerals 71 to 78 denote amplifiers; 81 to 84 are adders; and 91 and 92 are substracters.

In FIG. 2, the W signal from the amplifier 21 (FIG. 1) is amplified by the amplifiers 71 and 75. The Cy signal from the amplifier 22 (FIG. 1) is amplified by amplifiers 72 and 76. The Ye signal from the amplifier 23 (FIG. 1) is amplified by the amplifiers 73 and 77. Further, the G signal from the amplifier 24 (FIG. 1) is amplified by the amplifiers 74 and 78. The W signal from the amplifier 71 and the Ye signal from the amplifier 73 are further added by the adder 81. The Cy signal from the amplifier 72 and the G signal from the amplifier 74 are added by the adder 82. The outputs from the adders 81 and 82 are then subtracted by the subtracter 91, so that an R signal is produced.

Similarly, the W and Cy signals from the amplifiers 75 and 76 are added by the adder 83. The Ye and G signals from the amplifiers 77 and 78 are added by the adder 84. The outputs from the adders 83 and 84 are subtracted by the subtracter 92, so that a B signal is produced.

The arithmetic expressions of the above R and B signals are shown in expressions (1) and (2).

$$R = W - \alpha Cy + \beta Ye - \gamma G \tag{1}$$

$$B = W + \alpha' Cy - \beta' Ye - \gamma' G \tag{2}$$

where, W, Cy, Ye, and G represent the signal amounts derived from the photo sensing elements corresponding to the respective color filters and are proportional to the sensitivity ratios of the respective photo sensing elements. $\alpha$, $\beta$, and $\gamma$ denote the arithmetic operational ratios when the R signal is calculated. $\alpha'$, $\beta'$, and $\gamma'$ represent the arithmetic operational ratios when the B signal is calculated. The arithmetic operational ratios are 1 when the W signal is calculated.

The magnitude $M_r$ of the R aliasing to be generated in the R signal when the R signal is produced by means of the operation shown in the expression (1) is expressed as follows.

$$M_r(0, f_l/2) = W + \alpha Cy - \beta Ye - \gamma G \tag{3}$$

$$M_r(f_s/2, 0) = W - \alpha Cy - \beta Ye + \gamma G \tag{4}$$

$$M_r(f_s/2, f_l/2) = W + \alpha Cy + \beta Ye + \gamma G \tag{5}$$

In the expressions (3) to (5), the central coordinates on the spatial frequency at which the aliasings are generated are indicated in the parentheses. FIG. 4 shows the positions on the two-dimensional spatial frequencies at which the aliasings are generated. $f_s$ and $f_l$ denote sampling frequencies in the horizontal and vertical directions by the picture elements of the image pickup device, respectively. Reference numeral 10 denotes aliasings.

In the R aliasings, the aliasings shown in the expressions (3) and (4) are the aliasings which are caused by the sensitivity differences of the photo sensing elements corresponding to the respective color filters. These aliasings can be almost completely reduced by setting the arithmetic operational ratios so as to eliminate the sensitivity differences. The conditions in this case can be obtained in the following manner by setting the right sides in the expressions (3) and (4) to 0.

$$\beta = W/Ye \tag{6}$$

$$\gamma = \alpha \times Cy/G \tag{7}$$

Although $\beta$ and $\gamma$ can be determined as shown in the expressions (6) and (7), $\alpha$ is an arbitrary real number. Although the value of $\alpha$ may be set so as to obtain good color reproducibility, in general, $\alpha \simeq 1$. Therefore, it is sufficient to also set the values of $\beta$ and $\gamma$ to $\beta = W/Ye \simeq Cy/G \simeq \gamma$.

Therefore, the amplification factors of the amplifiers 71 to 74 are set so as to obtain the arithmetic operational ratios $\alpha$, $\beta$, and $\gamma$ as mentioned above.

The magnitude of $M_b$ of the B aliasing is expressed as follows similarly to the R aliasing.

$$M_b(0, f_l/2) = W - \alpha' Cy + \beta' Ye - \gamma' G \tag{8}$$

$$M_b(f_s/2) = W + \alpha' Cy + \beta' Ye + \gamma' G \tag{9}$$

$$M_b(f_s/2, f_l/2) = W + \alpha' Cy - \beta' Ye - \gamma' G \tag{10}$$

In these B aliasings, the aliasings shown in the expressions (8) and (10) are the aliasings which are caused by the sensitivity differences of the photo sensing elements corresponding to the respective color filters. These aliasings can be also almost perfectly reduced similarly to the R aliasing. The conditions to reduce the B aliasings can be obtained as follows by setting the right sides in the expressions (8) and (10) to 0.

$$\alpha' = W/Cy \tag{11}$$

$$\gamma' = \beta' \times Ye/G \tag{12}$$

Since $\beta' \simeq 1$, it will be understood that it is sufficient to set the arithmetic operational ratios such that $\alpha' = W/Cy \simeq Ye/G \simeq \gamma'$.

Therefore, the amplification factors of the amplifiers 75 to 78 are set so as to obtain the arithmetic operational ratios $\alpha'$, $\beta'$, and $\gamma'$ as mentioned above.

By setting the arithmetic operational ratios of the R and B signals as described above, the color aliasings which are caused by the sensitivity difference of the photo sensing elements corresponding to the color separation optical filters can be almost completely suppressed and a good picture quality can be derived. This suppressing effect is shown in FIG. 5.

Figure 5:
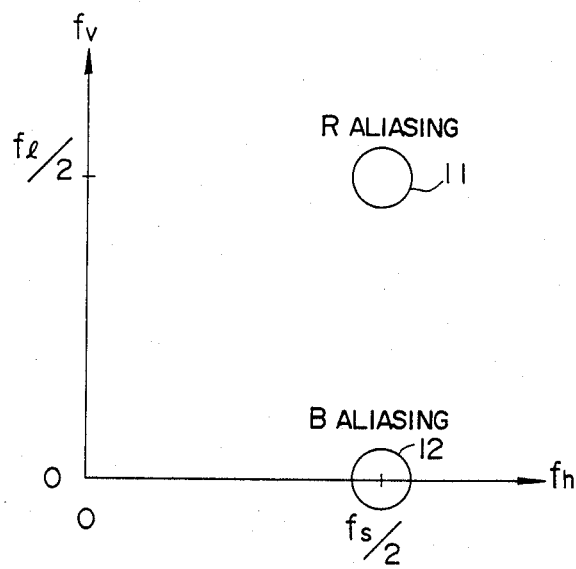

FIG. 5 shows the generation positions of the aliasings on the axis of the two-dimensional input spatial frequency similarly to FIG. 4. The R aliasing and B aliasing at $(0, f_l/2)$ can be perfectly suppressed owing to the effect of the invention and the remaining color aliasings are only an R aliasing 11 at $(f_s/2, f_l/2)$ which is caused in principle and a B aliasing 12 which is caused at $(f_s/2, 0)$.

Figure 6:
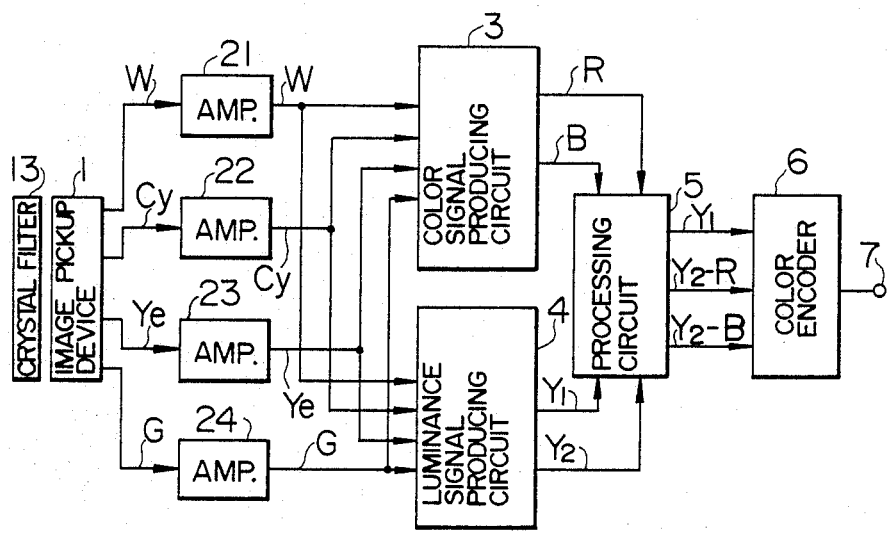
FIG. 6 is a block diagram showing a signal processing circuit of a video camera according to another embodiment of the invention.
Figure 7:
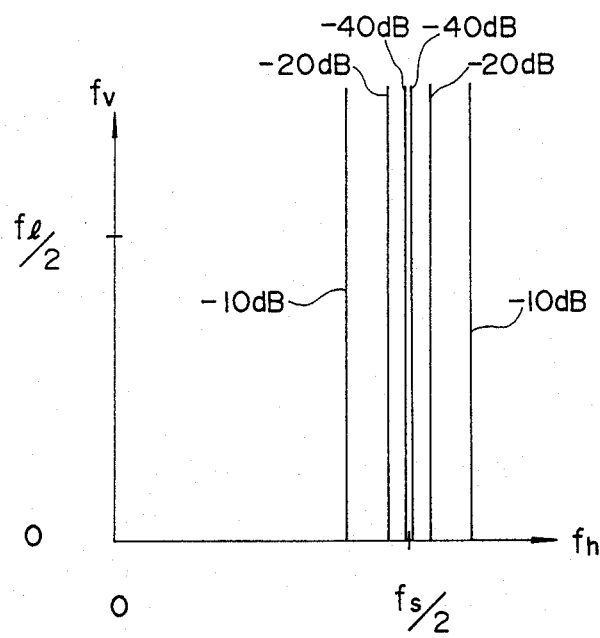
FIG. 7 is a characteristic diagram showing an example of the characteristics at the spatial frequency of a crystal plate filter.

FIG. 6 is a block diagram showing another embodiment of the invention and has substantially the same arrangement as the embodiment shown in FIG. 1 excluding that an optical low pass filter 13 using crystal is attached in front of the image pick up device 1. FIG. 7 shows the the spatial frequency characteristics of this optical low pass filter. Such characteristics can be realized by one crystal plate having a thickness which is determined such that the spectral distance due to the birefringence of crystal is equal to the distance of one picture element pitch in the horizontal direction of the photo sensing section of the image pickup device.

In this embodiment, in the R aliasings shown in the expressions (3) to (5), the aliasings shown in the expressions (4) and (5) can be suppressed by the optical low pass filter 13. Therefore, in order to suppress only the aliasing shown in the expression (3), it is sufficient to set the arithmetic operational ratios of the R signal by setting the right side in the expression (3) to 0. Likewise, it is sufficient to set the arithmetic operational ratios of the B signal by also setting the right side in the expression (8) to 0.

The remaining R aliasing 11 and B aliasing 12 shown in FIG. 5 can be completely suppressed by this crystal filter.

As shown in the embodiment, according to the invention, the aliasings which are caused by the sensitivity difference of the photo sensing elements corresponding to the color separation optical filters of the image pickup device can be sufficiently suppressed. Therefore, as shown in FIG. 5, no color aliasing is generated at (0, $f_l/2$). The complete aliasing suppressing effect can be obtained by use of only one crystal plate without deteriorating the resolution without using two expensive crystal plates nor a crystal plate using a $\lambda/4$ plate which were necessary to suppress the color aliasing in the conventional techniques.

Since the sensitivity ratios of the photo sensing elements of W, Cy, Ye, and G in the image pickup section vary in dependence on the color temperature, the magnitude of the aliasing also changes depending on the color temperature.

Figure 8:
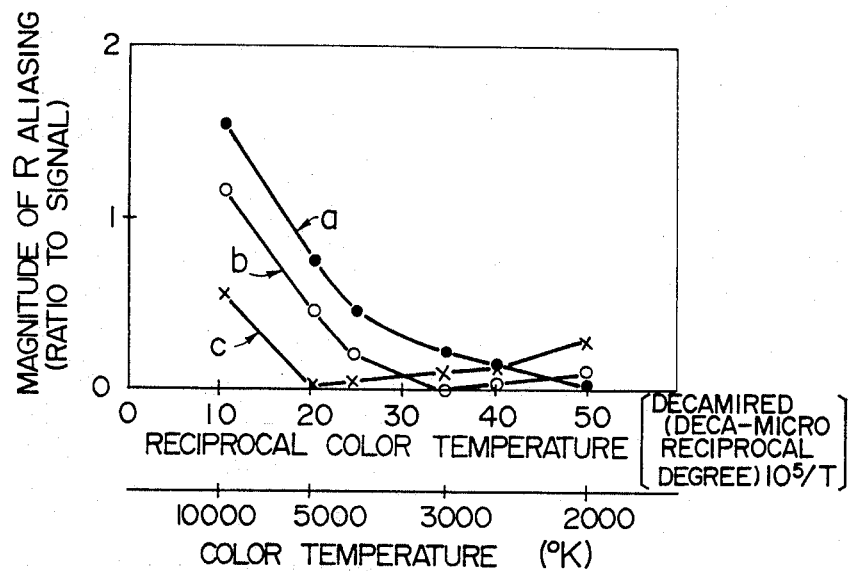
FIGS. 8 and 9 are graphs showing changes in intensities to changes in color temperatures of the R aliasing and B aliasing.
Figure 9:
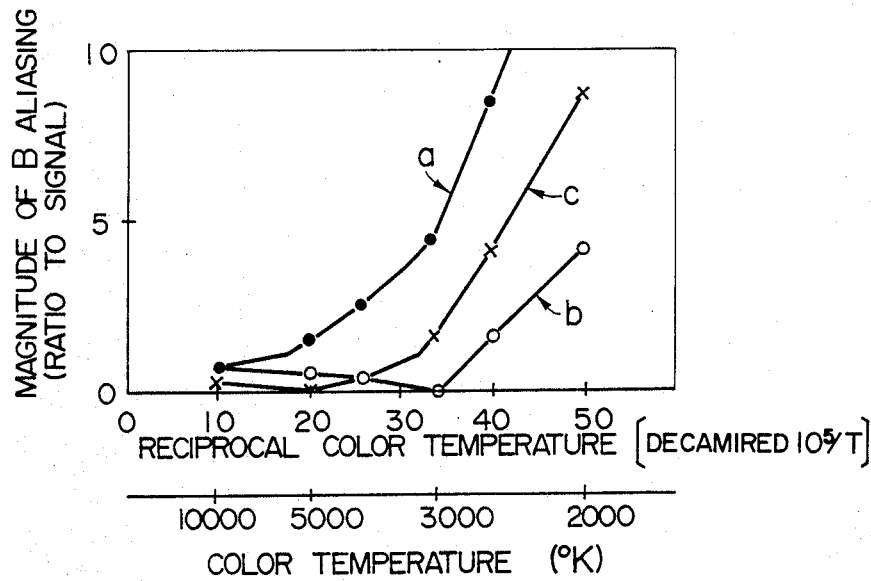

FIG. 8 is a graph showing the magnitude of R aliasing to the color temperature, in which an axis of abscissa denotes the reciprocal number of the color temperature and an axis of ordinate indicates the magnitude of aliasing which is generated at the frequency of (0, $f_l/2$). FIG. 9 is a graph showing the magnitude of B aliasing to the color temperature similarly to FIG. 8 and shows the B aliasing which is generated at the frequency of (0, $f_l/2$).

In FIGS. 8 and 9, when the R and B signals are produced by operating the output signals from the image pickup device at the arithmetic operational ratios of 1:1 as in the conventional technique, the aliasing maghitude is very large as shown by a curve a. When the arithmetic operational ratios are set so as to suppress the R and B aliasings by the amplifiers 71 to 74 and 75 to 78 in FIG. 2 at the color temperature of 5000° K., the aliasing is as shown in a curve b. Similarly, in the case of setting the arithmetic operational ratios at the color temperature of 3000° K., the aliasing is as shown in a curve c. In this manner, even if the amplification factors are set by the amplifiers 71 to 74 and 75 to 78 into the conditions as shown in the expressions (6), (7), (11), and (12) at a certain color temperature as mentioned above, the sensitivity ratios of the photo sensing elements of W, Cy, Ye, and G vary in dependence on the color temperature. Therefore, the aliasing can be almost perfectly suppressed at only color temperatures near a special color temperature at which the arithmetic operational ratios were set. However, it will be understood from the curves b and c that the color temperatures correspond to those in the color temperature range of 3000° to 7000° K., which is the ordinary use range in the video camera and the very large aliasing suppressing effect is obtained as compared with the conventional case shown by the curve a and the practically enough aliasing suppressing effect is obtained.

FIG. 8 shows the nature such that the R aliasing increases at high color temperatures. FIG. 9 shows the nature such that the B aliasing increases at low color temperatures. Therefore, it is very effective to set the amplification factors of the amplifiers 71 to 74 such that the arithmetic operational ratios of the R signal satisfy the condition expressions (6) and (7) at a high color temperature (e.g., 5000° K.) and to set the amplification factors of the amplifiers 75 to 78 such that the arithmetic operational ratios of the B signal satisfy the condition expressions (11) and (12) at a low color temperature (e.g., 3000° K.).

Figure 10:
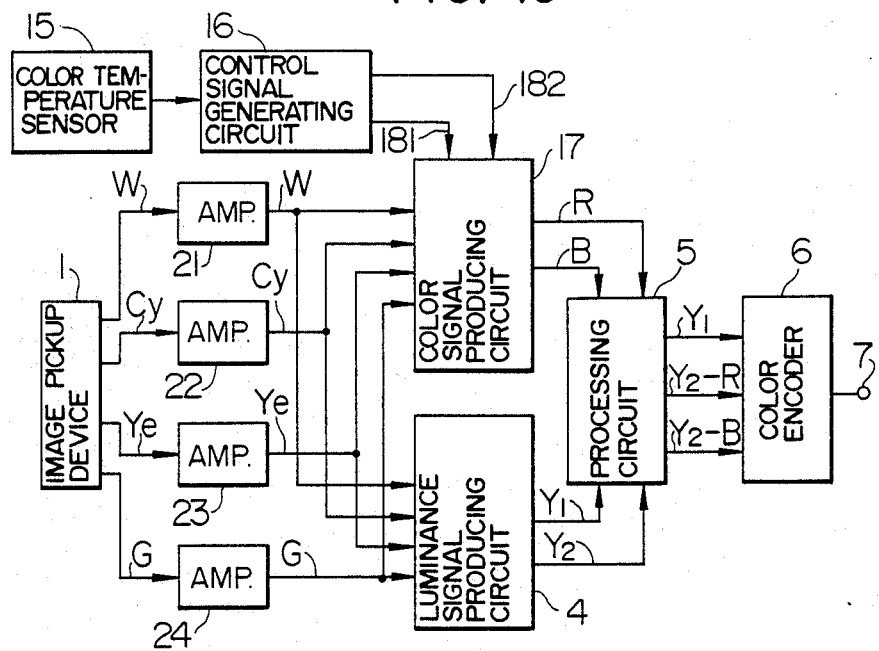
FIG. 10 is a block diagram of a signal processing circuit of a video camera according to still another embodiment of the invention.

FIG. 10 is a block diagram showing still another embodiment of the color video camera according to the invention. Reference numeral 15 denotes a color temperature sensor, 16 is a control signal generating circuit, and 181 and 182 indicate control signals. The circuit portions which are the same as or correspond to those in FIGS. 1 or 6 are designated by the same reference numerals and parts of their descriptions are omitted.

In this embodiment, a color signal producing circuit 17 arithmetically operates the W signal, Cy signal, Ye signal, and G signal from the amplifiers 21 to 24 by changing the arithmetic operational ratios in accordance with the color temperature, thereby producing the R and B signals. The color temperature sensor 15 detects the color temperature and in accordance with the detected color temperature, the control signal generating circuit 16 generates the control signal 181 to control the arithmetic operational ratios of the R signal and the control signal 182 to control the arithmetic operational ratios of the B signal. The control signals 181 and 182 are supplied to the color signal producing circuit 17 and the arithmetic operational ratios are changed in accordance with the color temperature.

Figure 11:
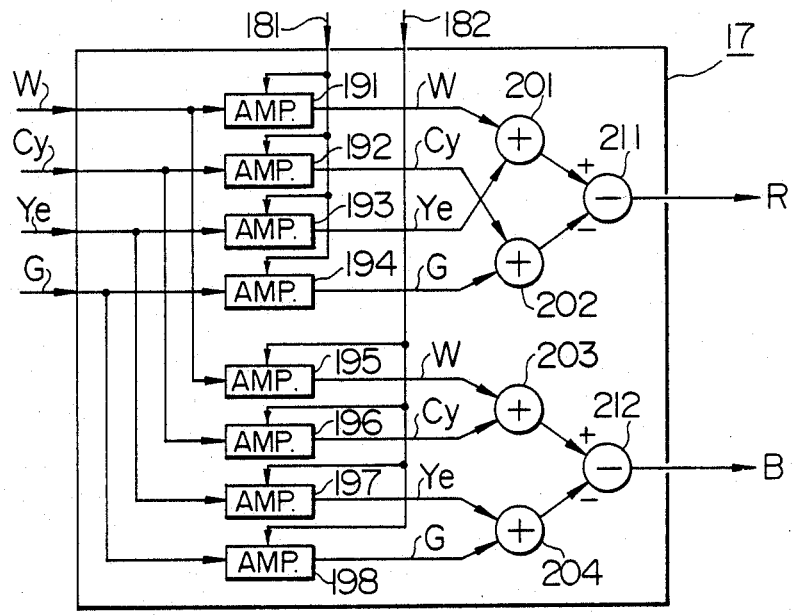
FIG. 11 is a circuit arrangement diagram showing a practical example of a color signal producing circuit in FIG. 10.

FIG. 11 is a block diagram showing a practical arrangement of the color signal producing circuit 17 in FIG. 10. Reference numerals 191 to 198 denote variable amplification factor amplifiers; 201 to 204 are adders; and 211 and 212 are subtracters.

In FIG. 11, the W signal is supplied to the amplifiers 191 and 195; the Cy signal to the amplifiers 192 and 196; the Ye signal to the amplifiers 193 and 197; and the G signal to the amplifiers 194 and 198, respectively. The amplification factors of the amplifiers 191 to 194 are controlled by the control signal 181. The amplification factors of the amplifiers 195 to 198 are controlled by the control signal 182. The W, Cy, Ye, and G signals amplified by the amplifiers 191 to 194 are subjected to predetermined arithmetic operations by the adders 201 and 202 and the subtracter 211, so that the R signal is produced. Similarly, the W, Cy, Ye, and G signals amplified by the amplifiers 195 to 198 are subjected to predetermined arithmetic operations by the adders 203 and 204 and the subtracter 212, so that the B signal is produced.

The amplification factors of the amplifiers 191 to 194 vary in accordance with the color temperature which is detected by the color temperature sensor 15 and are controlled such that the arithmetic operational ratios of the W, Cy, Ye, and G signals satisfy the R aliasing suppressing condition expressions (6) and (7) in a desired color temperature range (e.g., 3000° K. to 5000° K.). Likewise, the amplification factors of the amplifiers 195 to 198 with regard to the B signal are also changed in accordance with the color temperature.

Figure 12:
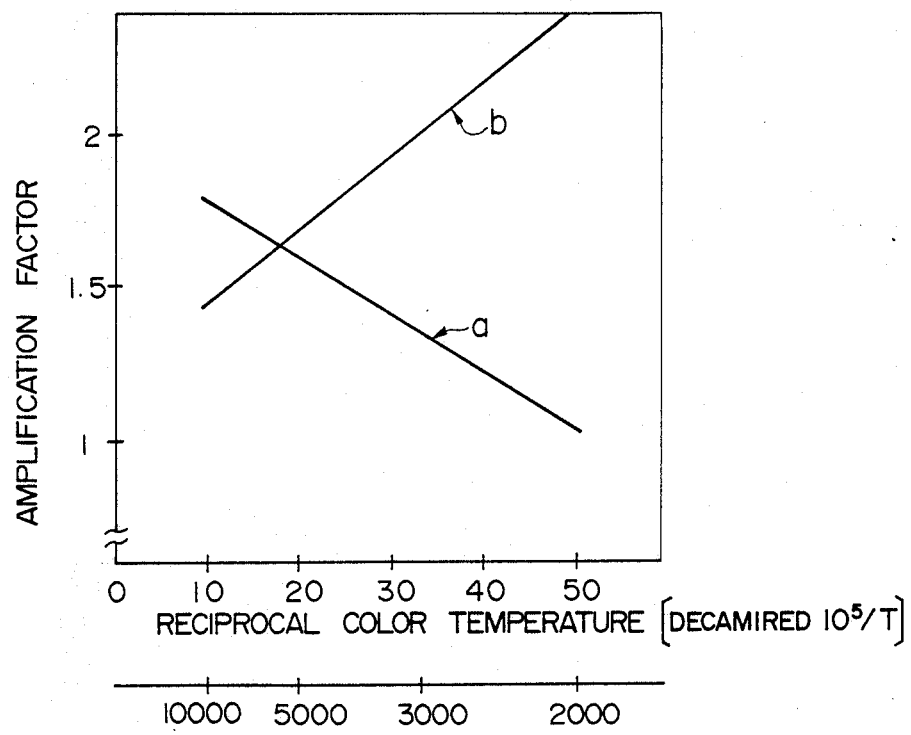
FIG. 12 shows an example of the characteristics of a variable amplification factor amplifier which is used in the circuit shown in FIG. 11.

FIG. 12 is a graph showing the relation between the amplification factors which are required for the variable amplification factor amplifiers in FIG. 11 and the color temperature. The amplification factors of the amplifiers 191 and 192 to amplify the W signal are set to 1. All of the amplification factors of the amplifiers 21 to 24 (FIG. 10) are equal. In this case, the amplification factors of the variable amplification factor amplifiers are the same as the arithmetic operational ratios of the R and B signals.

In FIG. 12, a line a denotes the amplification factors of the amplifiers 193 and 194 (FIG. 11) and the amplification factors of the Ye and G signals when the R signal is produced. A line b represents the amplification factors of the amplifiers 197 and 198 (FIG. 11) and the amplification factors of the Cy and G signals when the B signal is produced.

According to this embodiment, in FIGS. 8 and 9, the curve b or c is continuously shifted in accordance with the color temperature, thereby enabling the minimum point of the curve (namely, the minimum point of the aliasing) to be derived. Even if the color temperature varies, the good aliasing suppressing effect can be always assured without increasing the aliasing.

In this embodiment, it is not always necessary to constitute such that the color temperature is automatically detected. For example, this apparatus may be also interlocked with white balance means which is manually operated, thereby constituting such as to almost satisfy the relation in FIG. 12 continuously or by a switching manner.

FIG. 13 is a block diagram showing still another embodiment of a video camera according to the invention. Reference numeral 220 denotes a diaphragm control unit and 3' is a color signal producing circuit and the portions having the same functions corresponding to those shown in FIG. 1 are designated by the same reference numerals and their descriptions are omitted.

In this embodiment, the arithmetic operational ratios of the color signals are switched in the cases of low illuminance and high illuminance by a control signal indicative of a contraction degree of the lens (i.e., degree of illuminance), which signal is supplied from the diaphragm control unit 220. These arithmetic operational ratios are set so as to satisfy the condition expressions (6), (7), (10), and (11) such that the aliasing is minimized at a high illuminance. The arithmetic operational ratios of the respective W, Cy, Ye, and G signals are set to be nearly equal to 1:1 at a low illuminance, respectively.

The effects which are obtained by switching the arithmetic operational ratios in accordance with the high or low illuminance in this manner will now be described hereinbelow. The random noises such as thermal noises which are generated in the signal paths from the amplifiers 21 to 24 to the color signal producing circuit 3', thermal noises which are generated in the image pickup device 1, and the like are included in the respective signals of W, Cy, Ye, and G. In general, the amounts of noises in the W, Cy, Ye, and G signals are equal. On the other hand, for the signal amounts of W, Cy, Ye, and G signals to be derived from the image pickup device 1, the signal amount of the W signal is the largest and that of the G signal is the smallest in accordance with the sensitivity differences of them when an image of a white object is picked up. Therefore, the S/N ratio of the W signal is the best and that of the G signal is the worst in proportion to the sensitivity. Since the arithmetic operations are performed so as to correct the sensitivity differences under the condition such as to minimize the aliasing, as compared with the case where the W, Cy, Ye, and G signals are arithmetically operated at the arithmetic operational ratios of 1:1, respectively, the ratio of the G signal having the worst S/N ratio increases, so that the S/N ratios of the R and B signals also deteriorate. As described above, there is the contradictory relation between the aliasing and the S/N ratio such that when one of them is improved, the other deteriorates.

In most cases, the generation of the aliasing causes the problem in the case of a high illuminance in which the contrast of the object is high and the optimum focal point is obtained. The aliasing is hardly generated when the illuminance is low. On the other hand, the problem of the S/N ratio occurs in the case of a low illuminance. Therefore, the arithmetic operational ratios are switched to the ratios such as to suppress the aliasing in the case of a high illuminance as in this embodiment and to the ratios (e.g., 1:1 or the like) such as to improve the S/N ratio in the case of a low illuminance, thereby enabling the aliasing to be suppressed and also enabling the deterioration of the S/N ratio to be prevented.

In each of the above-described embodiments, the color filters of the image pickup device 1 have been arranged as shown in FIG. 3. However, the invention can be also similarly applied to the case where a pattern of arrangement of the respective color filters is changed as an arrangement of four picture elements of the complementary colors as shown in an example illustrated in FIG. 14A or to the case having a repetitive pattern based on eight-picture element unit as shown in FIG. 14B, or the like.

The foregoing embodiments relate to the examples of the signal processing circuits suitable to suppress the aliasings which are mainly caused in the red and blue signals. An embodiment to suppress the aliasings which are generated in the green signal will now be described.

In the case where four kinds of color filters of transparent (W), yellow (Ye), cyan (Cy), and green (G) are used and the image pickup device to output the W. Ye, Cy, and G signals is used similarly to the foregoing embodiments, the aliasings to be caused in the green signal can be suppressed by obtaining a green signal (G') on the basis of the following arithmetic expression.

$$G' = -W + Ye + Cy + 3G \qquad (13)$$

Figure 15:
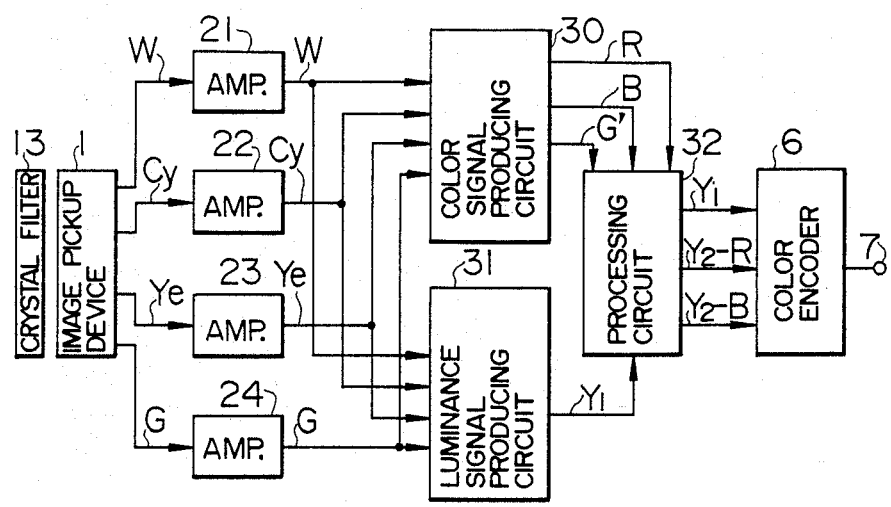
FIG. 15 is a diagram showing still another embodiment of the invention and is a block diagram of a signal processing circuit having means for suppressing the aliasing of the green signal as well.

FIG. 15 shows an embodiment of a signal processing circuit of a video camera having a circuit to produce the green signal at such arithmetic operational ratios. In the diagram, reference numeral 30 denotes a color signal producing circuit, 31 is a luminance signal producing circuit, and 32 is a processing circuit.

In this embodiment, different from the foregoing embodiment, the luminance signal of a narrow band to produce the color difference signals is not produced in the luminance signal producing circuit 31, but in place of this luminance signal, the G' (green) signal is produced in the color signal producing circuit 30 together with the R and B signals.

Figure 16:
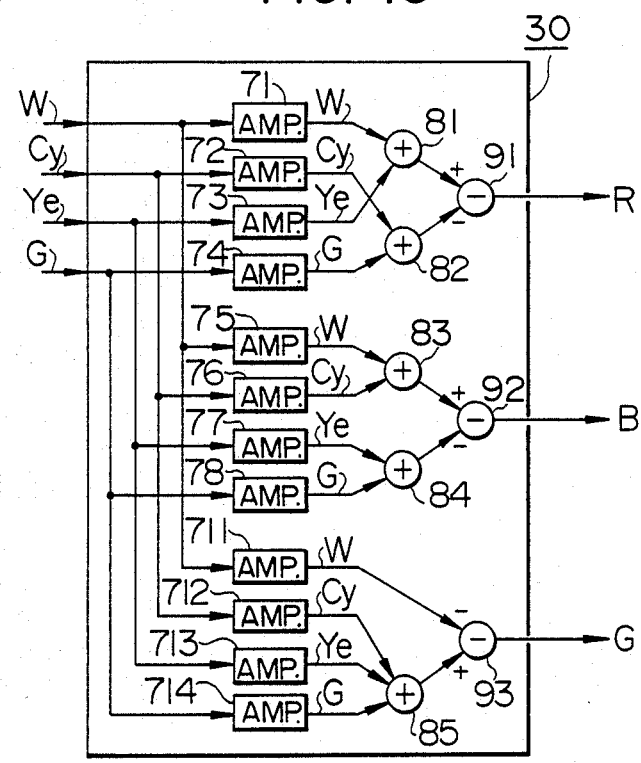
FIG. 16 is a circuit arrangement diagram showing an example of a practical arrangement of a color signal producing circuit shown in FIG. 15.

FIG. 16 is a block diagram showing a practical arrangement of the color signal producing circuit 30. In this arrangement, amplifiers 711 to 714, an adder 85, and a subtracter 93 are further added to the color signal producing circuit 3 shown in FIG. 2. Therefore, The R and B signals are arithmetically operated and produced in a manner similar to the embodiment in FIG. 2. For the green (G') signal, the W signal amplified by the amplifier 711 is applied to the subtracter 93, and the Cy and Ye signals amplified by the amplifiers 712 and 713 and the G signal amplified by the amplifier 714 by about three times larger than the Cy and Ye signals are added by the adder 85 and applied to the subtracter 93 in a manner such that the arithmetic operation shown in the expression (13) is substantially performed. In this manner, by obtaining the G' signal by the arithmetic operation shown in the expression (13) by use of not only the G signal to be directly obtained from the image pickup device 1 but also the W, Ye, and Cy signals, the aliasing which is caused at the spatial frequency (0, $f_l/2$) can be reduced. As will be understood from the pattern of arrangement of the color filters shown in FIG. 3, the G filters are vertically arranged for every two picture elements, so that the spatial sampling frequency in the vertical direction of the G signal is $f_l/2$. Therefore, carriers are caused at $f_l/2$ and in the case of obtaining the G' signal from only the G signal, the aliasing of the same magnitude as the signal is caused at the spatial frequency (0, $f_l/2$).

The aliasing $M_g$ (0, $f_l/2$) when the G' signal is produced by the arithmetic operation of expression (13) can be expressed by the following expression (14).

$$M_g (0, f_l/2) = W + Ye + Cy - 3G \quad (14)$$

Unless the sensitivities of W, Ye, Cy, and G are equal, the expression (14) will be 0, so that the aliasing can be completely suppressed. However, the sensitivities of W, Ye, and Cy are actually higher than the sensitivity of G. Therefore, it is sufficient to set the arithmetic operational ratios for W, Ye, and Cy to values which are slightly smaller than 1, to set the arithmetic operational ratios for G to values which are slightly larger than 3, and to set the optimum arithmetic operational ratios in consideration of the color reproducibility.

Figure 17:
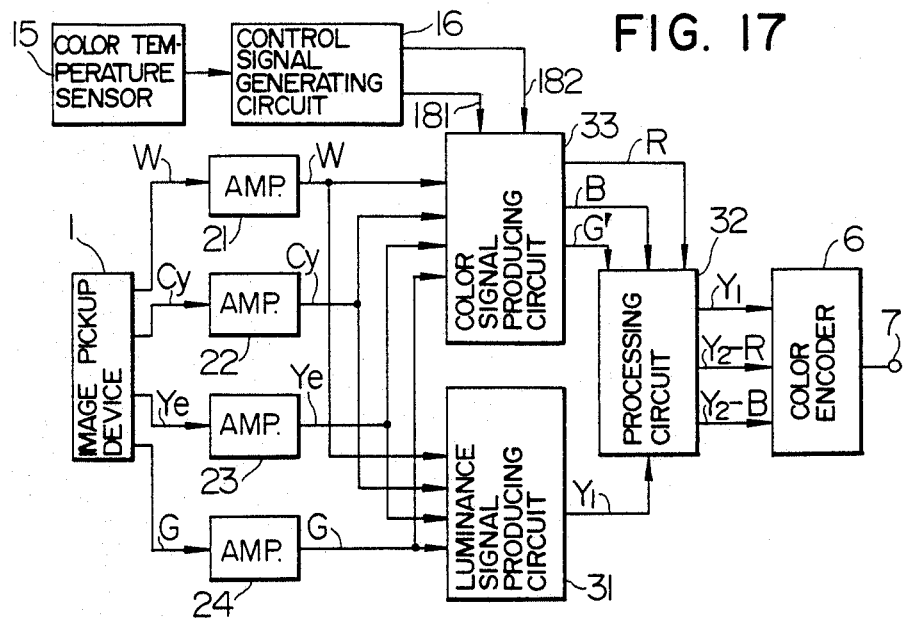
FIG. 17 is a block diagram showing another embodiment to which the means for suppressing the aliasing to be generated in the green signal is added.

FIG. 17 is a block diagram of a color video camera showing a further another embodiment. Reference numeral 33 denotes a color signal producing circuit and the portions of the same functions corresponding to those shown in FIGS. 10 or 15 are designated by the same reference numerals and their descriptions are omitted. In this embodiment, similarly to the embodiment shown in FIG. 10, the arithmetic operational ratios of the R and B signals are set to the optimum ratios in accordance with the change in color temperature, thereby enabling the aliasing to be always suppressed even if the color temperature varies. The G' signal is also produced in a manner similar to the embodiment shown in FIG. 15.

Figure 18:
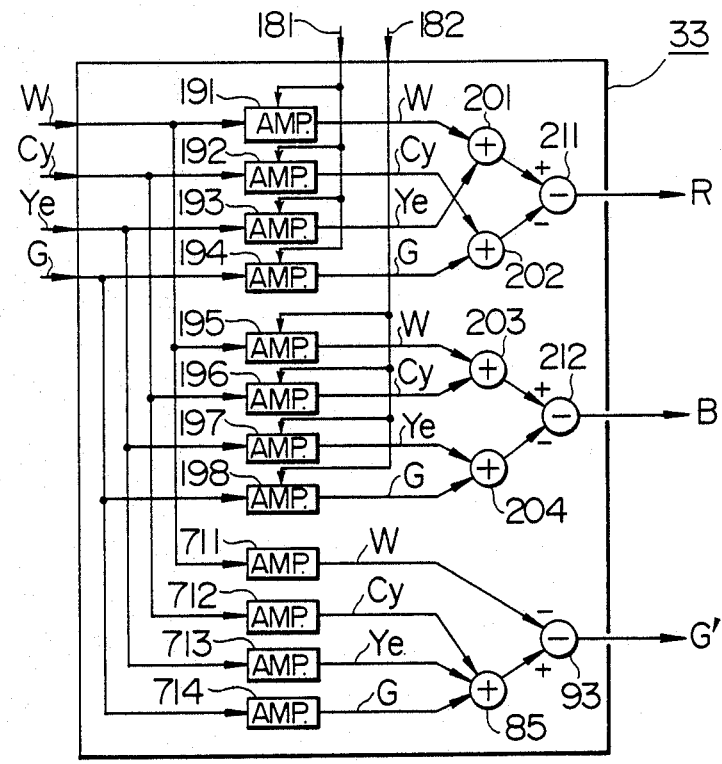
FIG. 18 is a circuit arrangement diagram showing an example of a practical arrangement of a color signal producing circuit shown in FIG. 17.

FIG. 18 is a block diagram showing a practical arrangement of the color signal producing circuit 33 shown in FIG. 17. The portions to produce the R and B signals have the same constitutions as the color signal producing circuit 17 shown in FIG. 11. The portion to produce the G' signal has the same constitution as the same portion in FIG. 16. The arithmetic operational ratios are set to the fixed values irrespective of the color temperature of the incident light. This is because a change amount of the aliasing which is caused in the G' signal for the change in color temperature is smaller than those of the R and B aliasings and the sufficient aliasing reducing effect can be obtained even if the arithmetic operational ratios are not always set to the optimum values in accordance with the color temperature change as in the case of the R and B signals. As mentioned above, according to this embodiment, even if the color temperature changes, the aliasings in the R, B, and G' signals are always small and the good picture quality can be obtained.

We claim:

1. A signal processing apparatus for obtaining a video signal in which color aliasings were suppressed for a color video camera having an image pickup device consisting of a number of photoelectric converting elements which are two-dimensionally arranged and four kinds of color separation optical filters which are repetitively arranged on the surfaces of said photoelectric converting elements in accordance with a predetermined order, said signal processing apparatus comprising:

an image pickup device for outputting a first signal, a second signal, a third signal, and a fourth signal respectively corresponding to said four kinds of color separation optical filters; and color signal producing means for producing a first color signal and a second color signal by processing said first to fourth signals on the basis of arithmetic operations of the following expressions:

$$C_1 = \alpha S_1 - \beta S_2 + \gamma S_3 - \delta S_4$$

$$C_2 32\ \alpha' S_1 + \beta' S_2 - \gamma' S_3 - \delta' S_4$$

wherein respective arithmetic operational ratios $\alpha, \beta, \gamma, \delta, \alpha', \beta', \gamma'$, and $\delta'$ of said first and second color signals are set so as to substantially satisfy the following condition $$\alpha S_1 + \beta S_2 = \gamma S_3 + \delta S_4 \text{ or } \alpha' S_1 + \gamma' S_3 = \beta' S_2 + \delta' S_4.$$

2. A signal processing apparatus according to claim 1, wherein said four kinds of color separation optical filters (FIGS. 3, 14A, 14B) are constituted by a first filter to transmit lights of all colors, a second filter to transmit cyan light, a third filter to transmit yellow light, and a fourth filter to transmit green light, and said color signal producing means produces a red signal as said first color signal and produces a blue signal as said second color signal.

3. A signal processing apparatus according to claim 2, wherein said color signal producing means, the respective arithmetic operational ratios are set under a condition such that a color temperature when the arithmetic operational ratios to produce the red signal are set is higher than a color temperature when the arithmetic operational ratios to produce the blue signal are set.

4. A signal processing apparatus according to claim 1, further comprising:

color temperature detecting means for detecting a color temperature of light which is input to the image pickup device; and means for changing the arithmetic operational ratios in said color signal producing means in accordance with an output of said color temperature detecting means.

5. A signal processing apparatus according to claim 1, further comprising:

diaphragm control means for controlling a diaphragm of a lens system in accordance with an amount of incident light to the image pickup device; and means for changing said arithmetic operational ratios in said color signal producing means in response to an output of said diaphragm control means.

6. A signal processing apparatus according to claim 2, further comprising:

color signal processing means for producing a green signal G' by performing an arithmetic operation process of the following expression $$B' = -W + Ye + Cy + 3G$$

from a W signal corresponding to a transparent filter, a Ye signal corresponding to a yellow filter, a Cy signal corresponding to a cyan filter, and a G signal corresponding to a green filter which are output in correspondence to said four kinds of color separation optical filters.

7. A signal processing apparatus according to claim 6, further comprising:
color temperature detecting means for detecting a color temperature of light which is input to the image pickup device; and
means for changing the arithmetic operational ratios in said color signal producing means in response to an output of said color temperature detecting means.

8. A method of producing color signals to produce a color television signal with less aliasing interference in a color video camera having an image pickup device consisting of a number of photoelectric converting elements which are two-dimensionally arranged and four kinds of color separation optical filters which are repetitively arranged on the surfaces of said photoelectric converting elements in accordance with a predetermined order, said color signal producing method comprising the steps of:
taking out a first signal, a second signal, a third signal, and a fourth signal respectively corresponding to said four kinds of color separation optical filters from said image pickup device; and
producing two color signals by arithmetically operating said first to fourth signals on the basis of the following expressions $$C_1 = \alpha S_1 - \beta S_2 + \gamma S_3 - \delta S_4$$

$$C_2 = \alpha' S_1 + \beta' S_2 - \gamma' S_3 - \delta' S_4$$

wherein respective arithmetic operational ratios $\alpha$, $\beta$, $\gamma$, $\delta$, $\alpha'$, $\beta'$, $\gamma'$, and $\delta'$ are set so as to substantially satisfy the following condition $$\alpha S_1 + \beta S_2 = \gamma S_3 + \delta S_4 \text{ or } \alpha' S_1 + \gamma' S_3 = \beta' S_2 + \delta' S_4.$$

9. A color video camera having a solid-state image pickup device consisting of a number of photoelectric converting elements which are two-dimensionally arranged and four kinds of color separation optical filters which are repetitively arranged on the surfaces of said photoelectric converting elements in accordance with a predetermined order, said color video camera comprising:
a solid-state image pickup device having four kinds of color separation optical filters consisting of a transparent filter to transmit lights of all colors, a yellow filter to transmit a yellow light, a cyan filter to transmit a cyan light, and a green filter to transmit a green light;
four amplifiers for respectively amplifying four kinds of signals consisting of a W signal, a Ye signal, a Cy signal, and a G signal corresponding to said four kinds of color separation optical filters which are output from said solid-state image pickup device;
a color signal producing circuit for producing a red signal R and a blue B signal by arithmetically operating said four kinds of signals on the basis of the relation of the following expressions $$R = \alpha W - \beta Cy + \gamma Ye - \delta G$$

$$B = \alpha' W + \beta' Cy - \gamma' Ye - \delta' G$$

wherein respective arithmetic operational ratios $\alpha$, $\beta$, $\gamma$, $\delta$, $\alpha'$, $\beta'$, $\gamma'$, and $\delta'$ are set so as to substantially satisfy the following condition $$\alpha W + \beta Cy = \gamma Ye + \delta G \text{ or } \alpha' W + \gamma' Ye = \beta' Cy + \delta' G;$$

a luminance signal producing circuit for producing a first luminance signal having a wide band frequency component and a second luminance signal having a narrow band frequency component which is used to obtain color difference signals on the basis of said four kinds of W, Cy, Ye, and G signals which are output from said solid-state image pickup device;
a signal processing circuit for producing a desired luminance signal and two kinds of color difference signals from the red signal, the blue signal, and the first and second luminance signals which are output from said color signal producing circuit and said luminance signal producing circuit; and
a color encoder for generating a color television signal in accordance with a desired television system from said desired luminance signal and two kinds of color difference signals which are obtained from said signal processing circuit.

10. A color video camera according to claim 9, wherein said color signal producing circuit consists of a color signal producing circuit for producing a green signal by performing an arithmetic operation of $$-W + Ye + Cy + 3G$$

using said four kinds of W, Ye, Cy, and G signals, and further
said luminance signal producing circuit is constituted by a luminance signal producing circuit for producing only the luminance signal having the wide band frequency component from said four kinds of signals.

* * * * *